Aug. 14, 1945.   J. W. SIMON   2,382,512
PIPE THAWING DEVICE
Filed March 4, 1944   2 Sheets-Sheet 2

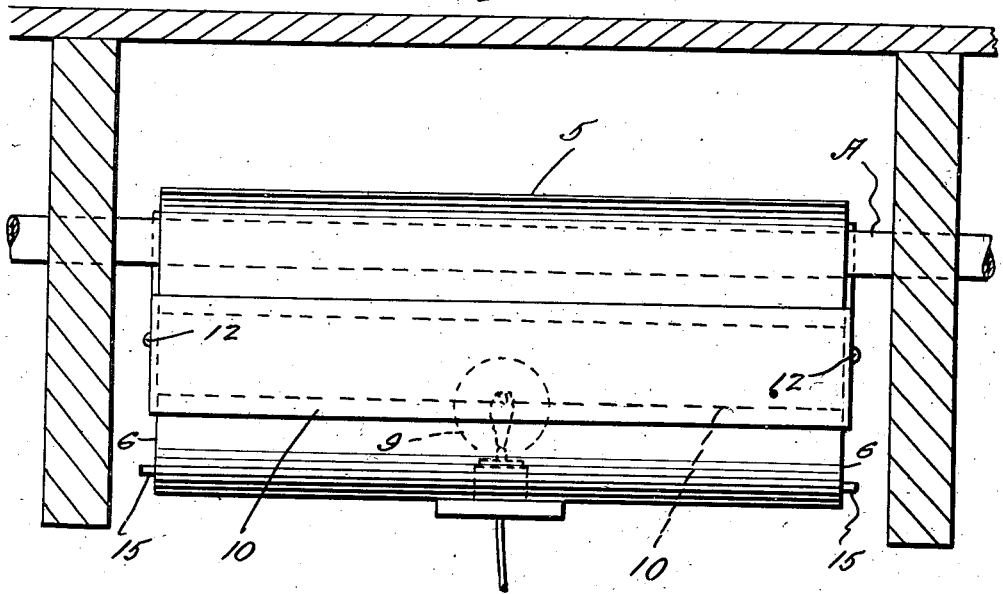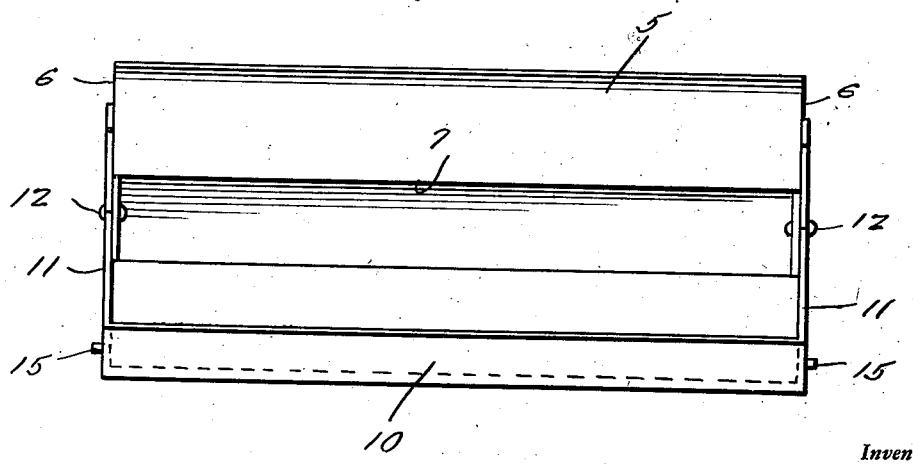

Inventor
Jake W. Simon
By Clarence A. O'Brien
and Harvey B. Jackson
Attorneys

Patented Aug. 14, 1945

2,382,512

UNITED STATES PATENT OFFICE 2,382,512

PIPE THAWING DEVICE

Jake W. Simon, Topeka, Kans.

Application March 4, 1944, Serial No. 525,097

3 Claims. (Cl. 138—33)

This invention relates to new and useful improvements in means for quickly thawing pipes.

The principal object of the present invention is to provide a pipe thawing device which can be quickly applied to a pipe, water in which has frozen.

Another important object of the invention is to provide an enclosed heater for circumferential spaced disposition around the frozen part of a pipe, to the end that heat can be applied to the entire circumferential surface of a pipe with considerably more efficient result than can be obtained with present-day thawing devices.

Still another important object of the invention is to provide a pipe thawing device consisting of an enclosed heater which will serve to retain heat in immediate circumferential contact with a pipe to be thawed.

These and other important objects and advantages of the invention will become apparent to the reader of the following description.

In the drawings:

Figure 1 is a side elevational view of the thawing device shown applied to a pipe.

Figure 2 is a side elevational view of the device in open position.

Figure 3:
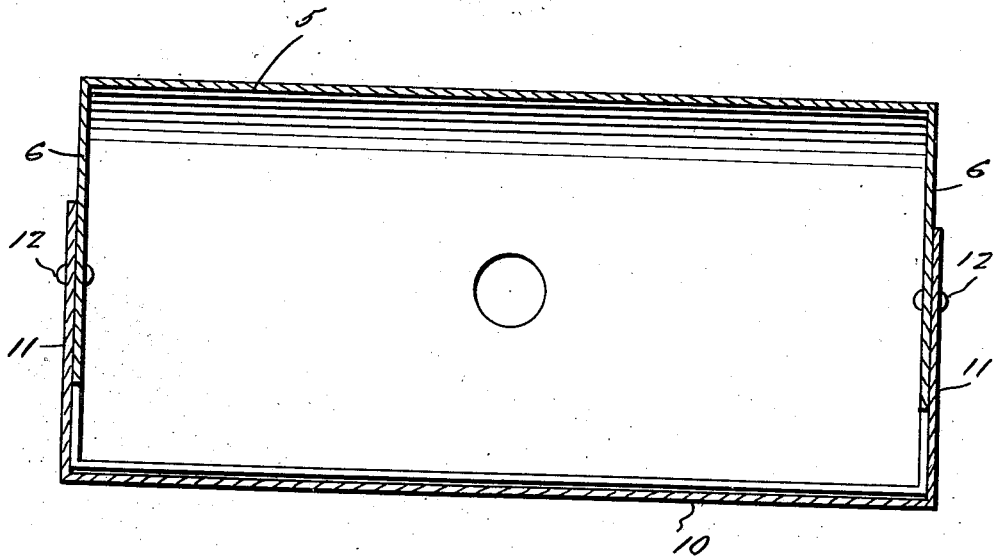
Figure 3 is a section taken substantially on the line 3—3 of Figure 1.
Figure 4:
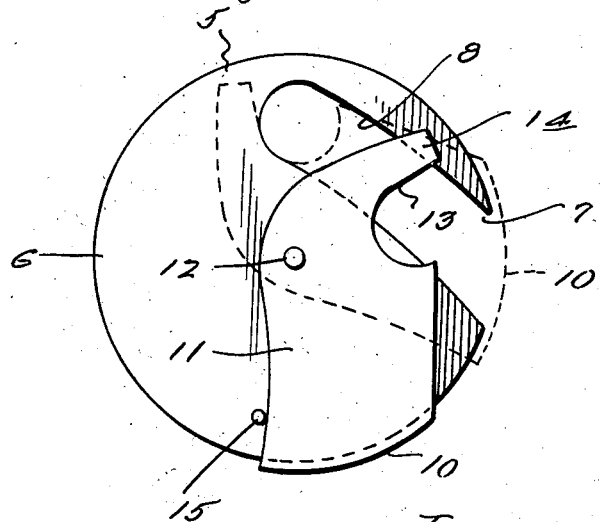
Figure 4 is an end elevational view of the device shown in open position.

Referring to the drawings wherein like numerals designate like parts, it can be seen that the device consists of an elongated cylindrical shell made up of a substantially cylindrical side wall 5 and end walls 6, 6. The side wall 5 has a longitudinal opening 7 therein which at its ends meets substantially chordal slots 8 which extend to terminate adjacent the side wall 5 as shown in Figure 4. Obviously, the purpose of this opening 7 and the slots 8 is so that the device can readily be set over a pipe A as shown in Figure 1.

However, inasmuch as it would be desirable to close the opening 7 to prevent the escape of heat from a heating element such as an electric light bulb 9 positioned in the shell, a visor 10 is provided for this opening, this visor having a pair of parallel leg members 11 pivoted as at 12 to the axle portions of the end walls 6, as shown in Figure 4. The pivotal ends of the legs 11 have notches 13 therein, defining fingers 14.

Short projections or studs 15 are provided on the end wall 6 to limit the downward disposition of the visor 10.

It can now be seen, that when this device is disposed over a pipe, the pipe will abut the fingers 14 and as the device is lowered onto the pipe, the fingers 14 will yield, raising the visor 10 to a position closing the opening 7 and the slots 8.

Thus it can be seen, that the shell is completely shut off to prevent the escape of heat from the heating element 9, to the end that the heat can rise and act in thawing the frozen condition of the pipe A.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A pipe thawing device comprising a shell having a pipe receiving slot therein extending longitudinally along the shell and inwardly of the end walls thereof, a visor for the slot pivotally secured to said shell, and means on said visor adapted to abut against a pipe over which the shell is disposed to close said slot.

2. A pipe thawing device comprising a shell having a pipe receiving slot therein extending longitudinally along the shell and inwardly of the end walls thereof, and a visor pivotally secured to said shell, for the slot operated by a pipe over which the shell is disposed, said visor being provided with parallel leg portions each provided with a finger adapted to abut a pipe over which the shell is disposed to swing the visor to slot closing position.

3. A pipe thawing device comprising a shell having a pipe receiving slot therein extending longitudinally along the shell and inwardly of the end walls thereof, a visor for the slot pivotally secured to said shell, means on said visor adapted to abut against a pipe over which the shell is disposed, and means limiting the pivotal movement of the said visor.

JAKE W. SIMON.